(12) United States Patent
Kaniyar et al.

(10) Patent No.: US 7,219,121 B2
(45) Date of Patent: May 15, 2007

(54) SYMMETRICAL MULTIPROCESSING IN MULTIPROCESSOR SYSTEMS

(75) Inventors: Sanjay N. Kaniyar, Redmond, WA (US); Alireza Dabagh, Kirkland, WA (US); N K Srinivas, Sammamish, WA (US); Bhupinder S. Sethi, Redmond, WA (US); Arvind Murching, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 10/112,812

(22) Filed: Mar. 29, 2002

(65) Prior Publication Data

US 2003/0187914 A1 Oct. 2, 2003

(51) Int. Cl.
*G06F 15/16* (2006.01)

(52) U.S. Cl. .................. 709/201; 709/250; 707/10

(58) Field of Classification Search ............. 709/201, 709/250; 370/235; 707/10
See application file for complete search history.

(56) References Cited

U.S. PATENT DOCUMENTS

| | | | |
|---|---|---|---|
| 5,655,103 A | 8/1997 | Cheng et al. | |
| 5,872,972 A * | 2/1999 | Boland et al. | 718/102 |
| 5,966,543 A | 10/1999 | Hartner et al. | |
| 6,038,651 A | 3/2000 | VanHuben et al. | |
| 6,052,733 A * | 4/2000 | Mahalingam et al. | 709/235 |
| 6,179,489 B1 * | 1/2001 | So et al. | 718/102 |
| 6,230,151 B1 * | 5/2001 | Agrawal et al. | 706/12 |
| 6,249,845 B1 | 6/2001 | Nunez et al. | |
| 6,314,501 B1 * | 11/2001 | Gulick et al. | 711/153 |
| 6,356,951 B1 * | 3/2002 | Gentry, Jr. | 709/250 |
| 6,470,389 B1 * | 10/2002 | Chung et al. | 709/227 |
| 6,480,876 B2 * | 11/2002 | Rehg et al. | 718/100 |
| 6,502,141 B1 | 12/2002 | Rawson, III | |
| 6,516,429 B1 | 2/2003 | Bossen et al. | |
| 6,618,386 B1 * | 9/2003 | Liu et al. | 370/401 |
| 6,643,636 B1 * | 11/2003 | Au et al. | 707/2 |
| 6,654,859 B2 | 11/2003 | Wooldridge | |
| 6,763,519 B1 * | 7/2004 | McColl et al. | 718/100 |
| 6,772,333 B1 * | 8/2004 | Brendel | 713/153 |
| 6,888,797 B1 * | 5/2005 | Cao et al. | 370/235 |
| 7,003,574 B1 * | 2/2006 | Bahl | 709/228 |
| 2002/0054567 A1 * | 5/2002 | Fan | 370/230 |
| 2002/0091748 A1 * | 7/2002 | Rehg et al. | 709/107 |
| 2002/0112076 A1 * | 8/2002 | Rueda et al. | 709/245 |
| 2002/0124104 A1 * | 9/2002 | Rappaport et al. | 709/238 |
| 2003/0061495 A1 * | 3/2003 | Minnick | 713/189 |
| 2003/0063611 A1 * | 4/2003 | Schaub et al. | 370/395.32 |
| 2003/0067930 A1 * | 4/2003 | Salapura et al. | 370/412 |
| 2003/0137978 A1 * | 7/2003 | Kanetake | 370/386 |
| 2003/0167346 A1 * | 9/2003 | Craft et al. | 709/250 |
| 2005/0071843 A1 * | 3/2005 | Guo et al. | 718/101 |

* cited by examiner

*Primary Examiner*—Thong Vu
*Assistant Examiner*—Hai V. Nguyen
(74) *Attorney, Agent, or Firm*—Wolf, Greenfield & Sacks, P.C.

(57) ABSTRACT

A new method and framework for scheduling receive-side processing of data streams received from a remote requesting client by a multiprocessor system computer is disclosed. The method receives data packets from the remote requesting client via a network and, for each data packet, applies a mapping algorithm to portions of the received data packet yielding a mapping value. The method further applies the map value to a processor selection policy to identify a processor in the multiprocessor system as a selected processor to perform receive-side processing of the data packet. The method queues the received data packet for processing by the selected processor and invokes a procedure call to initiate processing of the data packet.

28 Claims, 14 Drawing Sheets

SYMMETRICAL MULTIPROCESSING IN MULTIPROCESSOR SYSTEMS

AREA OF THE INVENTION

The present invention generally relates to the area of computer networks and implementation of symmetrical multiprocessing in multiprocessor systems. More particularly, the present invention is directed to systematically partitioning I/O tasks for network connections across processors in a multiprocessor system (and vice-versa).

BACKGROUND OF THE INVENTION

Today's traditional computer architectures enlist computer systems with multiple processors to perform receive-side processing of requests received across a network from remote clients. The requests are in the form of I/O tasks that are partitioned across multiple processors working in concert to execute the I/O tasks. Allowing multiple processors to simultaneously perform incoming I/O tasks provides an overall faster performance time for the computer system. One of the more challenging aspects of utilizing multiple processors is "scalability," that is, partitioning the I/O tasks for connections across processors in a way that optimizes each processor individually and collectively.

A well-known computer hardware system for achieving scalability is a "symmetric multiprocessor" (SMP) system. An SMP system uses two or more identical processors that appear to the executing software to be a single processing unit. In an exemplary SMP system, multiple processors in one system share a global memory and I/O subsystem including a network interface card commonly referred to as a "NIC." As is known in the art, the NIC enables communication between a host computer and remote computers located on a network such as the Internet. NICs communicate with remote computers through the use of a network communications protocol, for example, TCP ("Transmission Control Protocol"). TCP, like other protocols, allows two computers to establish a connection and exchange streams of data. In particular, TCP guarantees lossless delivery of data packets sent by the remote computer to the host computer (and vice-versa).

After a network connection is established between a host computer and a remote computer, the remote computer sends a data stream to the host computer. The data stream itself may comprise multiple data packets and ultimately entail sending more than one data packet from the remote computer to the host computer. When the NIC on the host computer receives a first data packet, the first data packet is stored in memory along with a packet descriptor that includes pointer information identifying the location of the data in memory. Thereafter, an interrupt is issued to one of the processors in the SMP system. As the interrupt service routine (ISR) runs, all further interrupts from the NIC are disabled and a deferred procedure call (DPC) is requested to run on the selected processor. Meanwhile, as more data packets are received by the NIC, the data packets are also stored in memory along with packet descriptors. No interrupts are generated, however, until the DPC for the first interrupt runs to completion.

As the DPC runs, the data packet descriptors and associated data packets are pulled from memory to build an array of received packets. Next, protocol receive-processing is invoked indirectly via calls to a device driver interface within the DPC routine. An exemplary interface is the Network Driver Interface Specification (NDIS), a Microsoft Windows device driver interface that enables a single NIC to support multiple network protocols. After the DPC runs to completion, interrupts are re-enabled and the NIC generates an interrupt to one of the processors in the multiprocessor system. Because only one DPC runs for any given NIC at any given time, when the scheduling processor is running a receive DPC other processors in the system are not conducting receive processing. This serialization problem limits scalabilty in the SMP system and degrades performance of the multiprocessor system.

Similarly, because data packets relating to a particular network connection are often received by the NIC at different intervals, receive-side processing of data packets may occur on different processors under the above-described scheme. When a processor processes data packets belonging to a particular network connection, the state for that network connection is modified. If data packets associated with this network connection were previously processed by a first processor, the network connection state resides in the first processor's cache. In order for a second processor to process packets related to a request previously processed by the first processor, the state is pulled from the first processor's cache to main memory, and the first processor's cache is invalidated. This process of copying the state and invalidating the cache results in performance degradation of the multiprocessor system. Similarly, with the above scheme, send and receive processing for the same network connection can occur simultaneously on different processors leading to contention and spinning that also causes performance degradation.

SUMMARY OF THE INVENTION

The present invention comprises a new method and framework for implementing symmetrical multiprocessing in a multiprocessor system and increasing performance of the multiprocessor system. More particularly, the present invention systematically partitions I/O tasks for network connections across processors in the multiprocessor system so that each connection state lives on a single processor for its lifetime. This method and framework ensure that I/O tasks associated with a particular connection are processed by the same processor. In different embodiments of the invention, the new method is implemented in software and/or hardware of the multiprocessor system.

More particularly, a receive-side scheduling framework embodying the present invention includes a network interface card, memory and two or more processors, communicably coupled to each other to handle network connections and I/O tasks associated with the network connections. An example of such an I/O task is a data stream associated with the Transmission Control Protocol (also referred to as "TCP"). According to the invention, the data packets received by a NIC in the multiprocessor system are stored, along with a data packet descriptor, in memory. A scheduling processor in the multiprocessor system, selected by a load-balancing algorithm, reads each data packet and applies a mapping algorithm to portions of the data packet yielding a map value. The map value, in conjunction with a processor selection policy, determines which "selected processor" in the multiprocessor is scheduled to manage the data stream. The mapping algorithm is any acceptable algorithm, such as a hashing function, adopted by the system that ensures data packets received from the same network connection are routinely scheduled for processing by the same selected processor in the multiprocessor system. The scheduling processor then processes the data requests assigned to the scheduling processor itself. Thereafter, each of the other selected processors is requested to execute the data requests scheduled to that selected processor.

In another embodiment of the invention, data packets received by the NIC from a network connection are individually hashed, with the use of a hashing function, by the NIC. The hashing function yields a hash value that identifies which processor is selected to process the data packet. The hashing function is chosen such that the load is distributed optimally across the processors. The hash value is then stored along with a data packet descriptor and the data packet in memory. A scheduling processor, selected by a load-balancing algorithm, then reads each data packet descriptor to ascertain the hashing value. With the use of a processor selection policy, each data packet is queued for processing by the selected processor.

In yet another embodiment of the invention, the data packets received by the NIC in the multiprocessor system are individually hashed by the NIC to determine the hash value identifying the selected processor scheduled to process the data packet. Like the previous embodiments, the hashing function is selected such that the load is distributed optimally across the processors. The NIC, which maintains a processor queue for each processor in the system, then queues the packet descriptor to the appropriate processor queue based on the hash value. For those processors with non-empty processor queues, the NIC issues a request to the selected processor to process the contents of the processor queue.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF ILLUSTRATIVE EMBODIMENTS

In some situations, it is beneficial if the same processor in a multiprocessor system performs receive-side processing of all I/O tasks relating to a particular connection. There is a need for a method and framework for systematically partitioning I/O tasks for connections across processors in a multiprocessor system such that the connection state lives on a single processor for the lifetime of a network connection.

Figure 1:
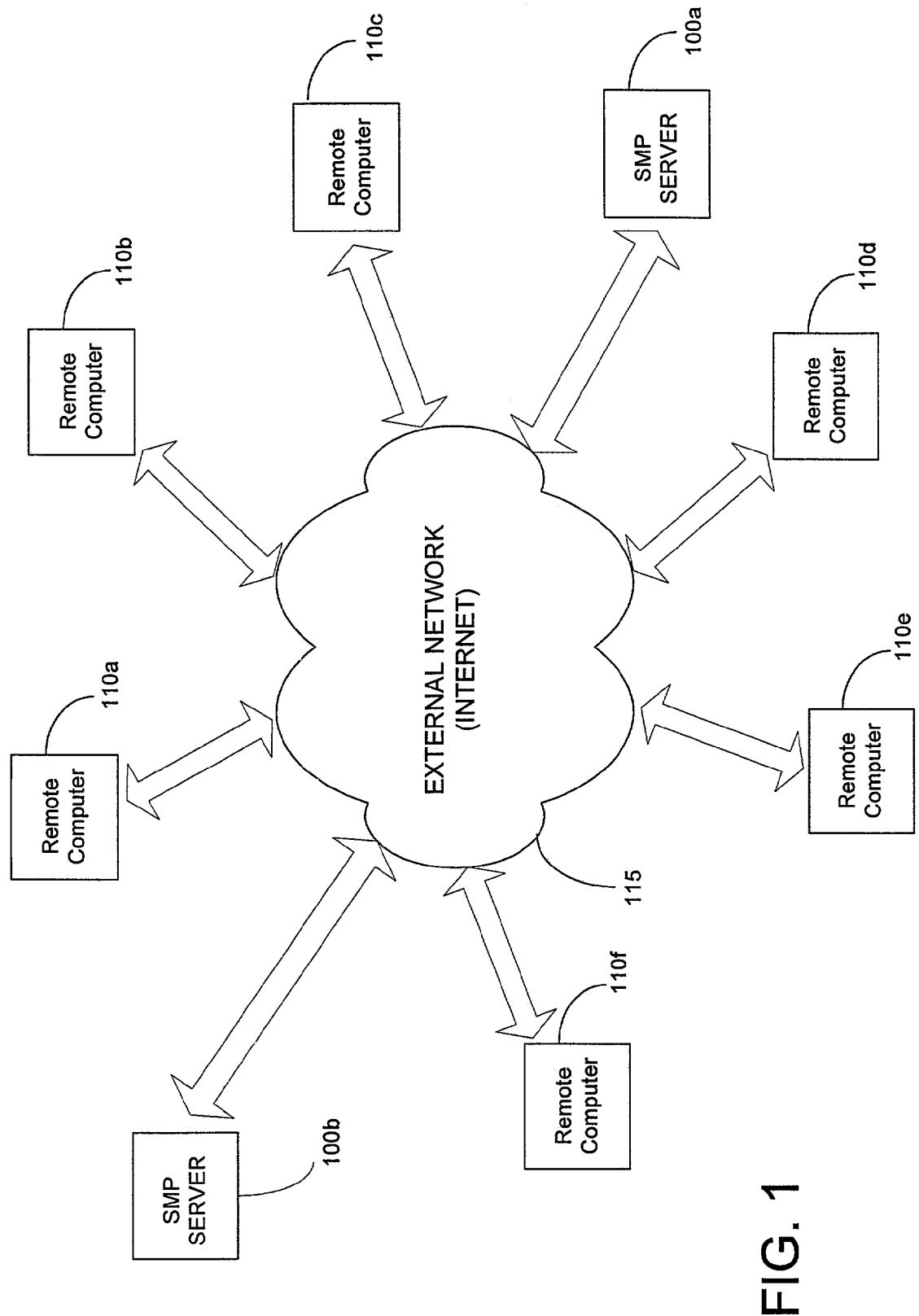
FIG. 1 is a schematic diagram of a networked computer system in which aspects of the present invention and/or portions thereof may be incorporated.

In an embodiment of the present invention, a receive-side processing technique comprises communication system software executed within an SMP system computer operating environment such as the one depicted in FIG. 1, and in particular one that is configured to support potentially hundreds of thousands of concurrent network connections and data streams. Such a computing environment is potentially present in popular website server configurations that exist today. FIG. 1 illustratively depicts an example of a suitable operating environment within which the invention is implemented. The example network includes several remote computers 110a–f communicating with multiprocessor systems 100a–b over a network 115, represented as a cloud. Network 115 includes any of many well-known components, such as routers, gateways, hubs, etc. and allows remote computers 110a–f to communicate via wired and/or wireless media.

The operating environment is only one example of a suitable operating environment and is not intended to suggest any limitation as to the scope of use or functionality of the invention. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention is described in the general context of computer-executable instructions, such as program modules, being executed by a system computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
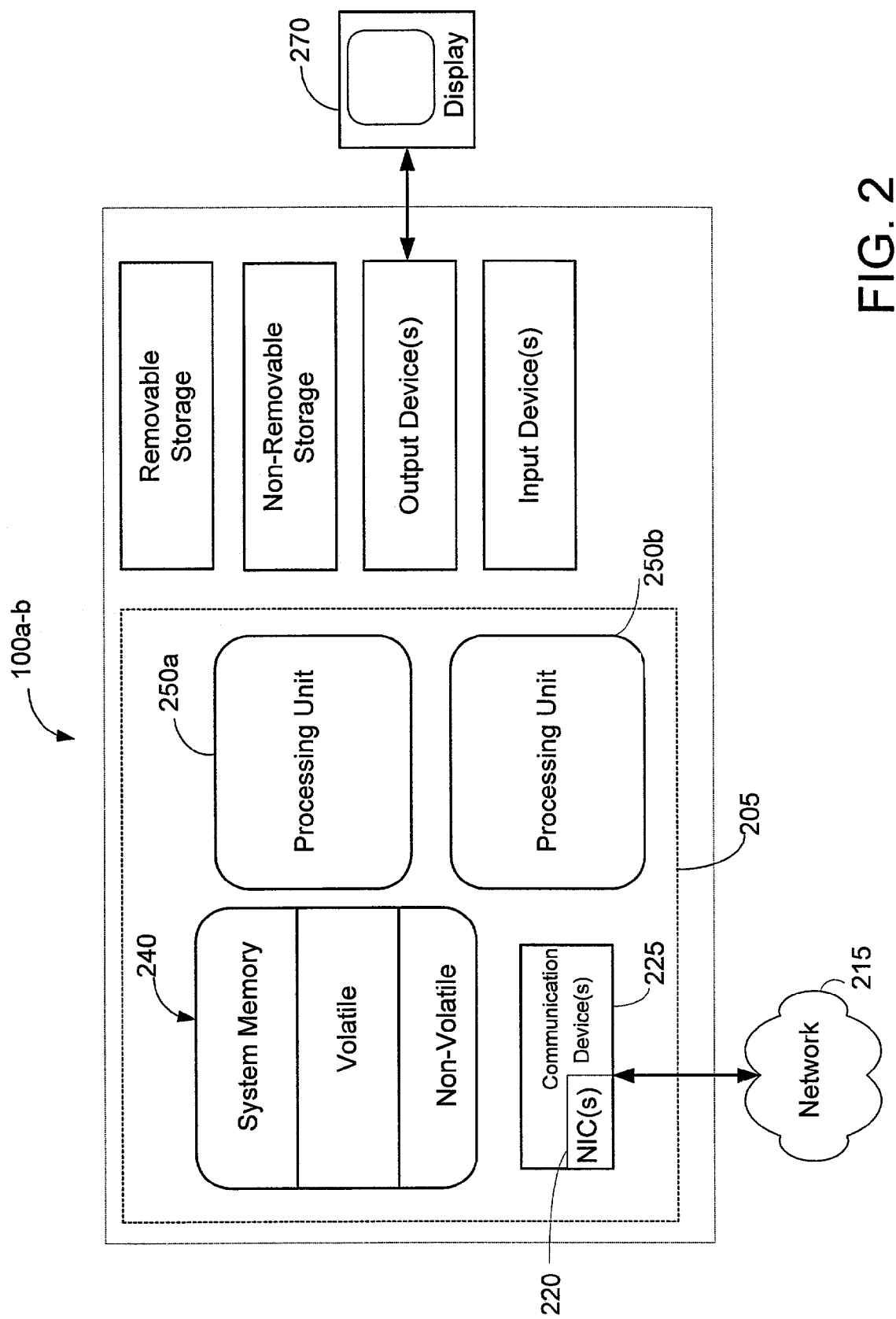
FIG. 2 is a block diagram of a general purpose multiprocessor system in which aspects of the present invention and/or portions thereof may be incorporated.

Referring to FIG. 2, an example of a basic configuration for multiprocessor systems 100a–b on which the invention described herein is implemented is shown. Multiprocessor systems 100a–b comprise any appropriate multiprocessor computer or server capable of achieving scalability beyond a single processor. A suitable hardware structure for achieving scalability beyond a single processor is a "symmetric multiprocessor" (SMP) system. In an SMP system, multiple processors in one computer share a global memory and I/O subsystem.

In its most basic configuration, SMP systems 100a–b include two or more processing units 250a–b, communication device(s) 225 and memory 240. Depending on the exact configuration and type of SMP system, the memory 240 may be volatile (such as RAM), non-volatile (such as ROM or flash memory) or some combination of the two. SMP systems 100*a–b* also contain communication device(s) 225 that allows the SMP systems 100*a–b* to communicate with other computers in the network. The communication device (s) include a network interface, such as a network interface card (NIC) 220, coupled to a network 215. Various and multiple NICs are employed in alternative embodiments of the invention including, but not limited to, cards that support Ethernet (802.3), Token Ring (802.5), ARCNET 878.2, Wireless and ATM. Communication device(s) and media typically embody computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media. This most basic configuration is illustrated in FIG. 2 by dashed line 205.

Additionally, the SMP systems 100*a–b* may also have additional features/functionality. For example, SMP systems 100*a–b* may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the SMP systems 100*a–b*. Any such computer storage media may be part of the SMP systems 100*a–b*. SMP systems 100*a–b* may also have input devices such as a keyboard, mouse, pen, voice input device, touch input device, etc. Output devices such as a display 270, speakers, a printer, etc. may also be included. All these devices are well known in the art and need not be discussed at length here.

Figure 3A:
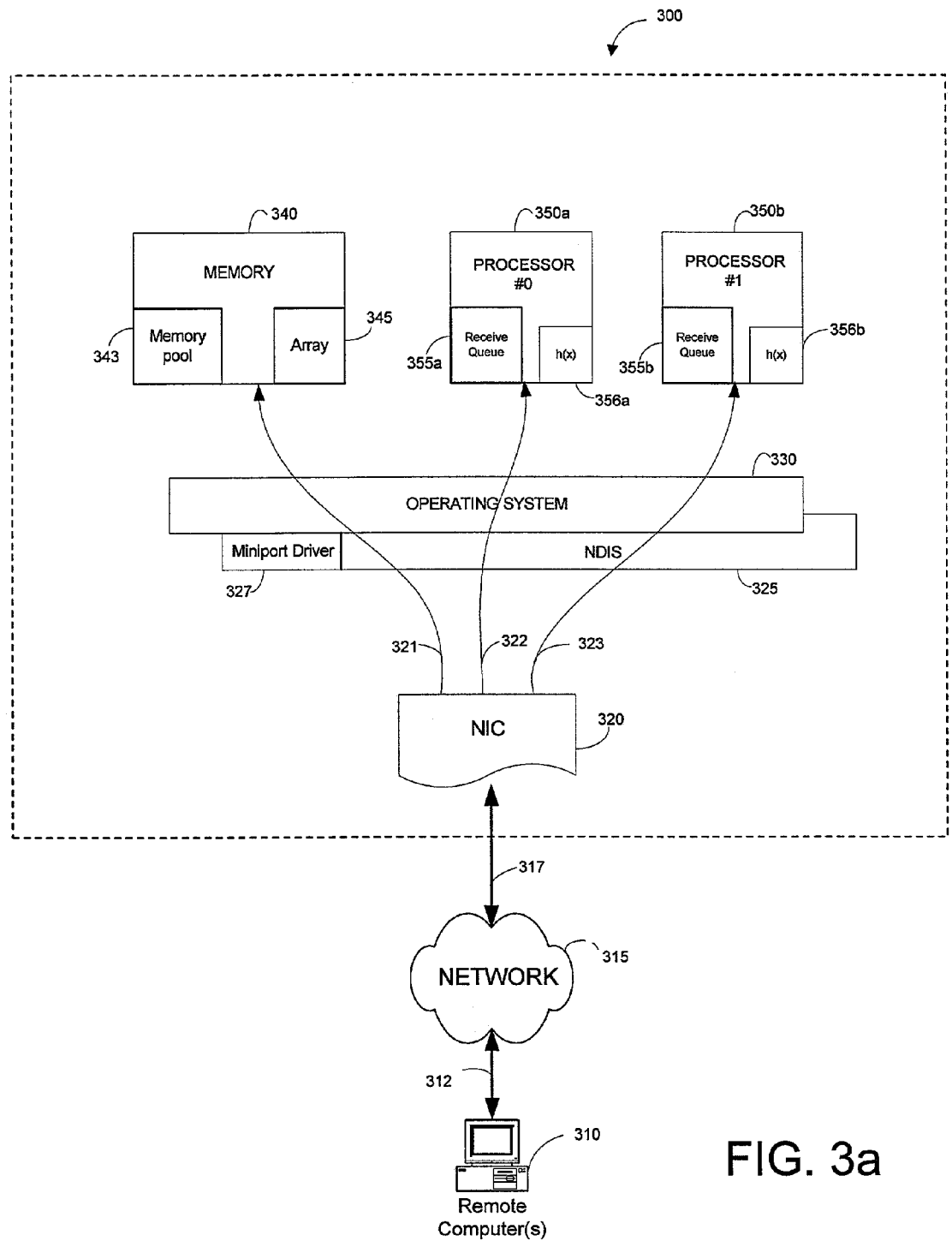
FIGS. 3a, 3b and 3c are schematic diagrams of general purpose multiprocessor systems in which aspects of the present invention and/or portions thereof may be incorporated.

Having described an exemplary computing environment for executing a method for scheduling receive-side processing in a multiprocessor system embodying the present invention, attention is directed to FIG. 3*a* that depicts an exemplary networked multiprocessor environment within which the present invention is practiced. As depicted in FIG. 3*a*, a multiprocessor system 300 includes a network interface card (NIC) 320 connected via data links 312, 317 and network 315 to remote computer(s) 310. The NIC 320 connected to main memory 340 via data link 321 and to processors 350*a*, 350*b* via data links 322, 323. Communication between the NIC 320 and the main memory 340 and processors 350*a*, 350*b* is facilitated by an operating system 330. An example of an operating system is the MICROSOFT WINDOWS operating system, also referred to as "Windows NT," "Windows 2000" or "Windows XP." To enable communication with the input/output devices, the operating system 330 utilizes NDIS ("Network Driver Interface Specification") 325, a device driver interface. As is known in the art, NDIS 325 includes a miniport driver 327, a software module that manages the NIC 320 hardware interface including such operations as initializing the NIC 320, allocating memory and sending and receiving data through the NIC 320.

As is known in the art, communication between the remote computer(s) 310 and the multiprocessor system 300 requires the use of a communications protocol. In an embodiment of the present invention, connections are established through the use of TCP ("Transmission Control Protocol"), a communications protocol that enables two networked computers to establish a connection and exchange streams of data. Various communications protocols are employed in alternative embodiments of the invention such as IPX/SPX, NetBEUI and AppleTalk. With continued reference to FIG. 3*a*, after a network connection is established between the remote computer 310 and the multiprocessor system 300, packets of data are sent serially through the network 315 and received by the NIC 320. As is known in the art, the data stream may entail the transmission of numerous data packets received by the NIC 320 at different intervals. The data packet contains information relating to the data stream such as the source port number, destination port number and specific data request.

As will be explained further herein below, when a first packet of data is received by the NIC 320 from the network 315, the data packet is stored in a pre-allocated pool of memory 343 located in the main memory 340 of the multiprocessor system 300. Direct memory access (DMA), a method by which memory access is accomplished without the use of a processor, is used by the NIC 320 to store the data packet in memory 343. At the same time the data packet is stored in the memory pool 343, a data packet descriptor, including pointer information identifying the location of the data packet in memory pool 343, is stored in a memory array 345. After the data packet and data packet descriptor are stored in memory 340, an interrupt request (IRQ) is sent from the NIC 320 to a "scheduling processor," one of the processors 350*a*, 350*b* in the multiprocessor system 300 chosen through the use of a load-balancing algorithm for the purpose of handling original requests. Ideally, the scheduling processor chosen by the load-balancing algorithm is the least busy processor in the multiprocessor system 300. Alternatively, the interrupt request rotates between the available processors on a round-robin basis or the NIC 320 could be affinitized to a certain processor in the system such that all interrupt requests from a certain network connection routinely proceed to the same processor. In the example of FIG. 3*a*, the load-balancing algorithm determines that processor 350*a* will be the scheduling processor.

As is known in the art, interrupt servicing typically consists of two driver-provided components: an "interrupt service routine" (ISR) and a "deferred procedure call" (DPC). Both the ISR and DPC use costly processor cycles that degrade performance of the system if not used economically. ISRs and DPCs are well known in the art and need not be discussed at length here. After the interrupt is generated by the NIC 320, the ISR disables generation of further interrupts by the NIC 320. Thereafter, ISR requests a DPC to execute scheduling of the data packet by placing a DPC object in the receive queue 355*a* of the scheduling processor 350*a*. While the DPC object is removed from the receive queue 355*a*, additional data packets associated with the data stream and other data streams are received by the NIC 320 from the network 315. All additional data packets are also stored in the memory pool 343 via the use of DMA and associated packet descriptors are stored in the memory array 345. No interrupts, however, are generated because the DPC is still running on scheduling processor 350*a* and interrupts from the NIC have been disabled. Only after the DPC runs to completion on processor 350*a* are interrupts on the NIC 320 re-enabled.

As the DPC runs on processor 350*a*, both the packet descriptors from memory array 345 and the data packet from the memory pool 343 are read. Processor 350*a*, by way of the miniport driver 327, then runs a mapping algorithm to determine which processor in the multiprocessor system 300 will process the data packet. The mapping algorithm is any acceptable algorithm, such as a hashing function, adopted by the system that ensures data packets received from the same network connection are routinely scheduled for processing by the same selected processor in the multiprocessor system. In this embodiment, the hashing function 356*a* uses any part of the communication header, alone or in combination, as a method for determining a hash value. The hash value, in conjunction with a processor selection policy, identifies which processor 350*a* or 350*b* (as shown in FIG. 3*a*) in the multiprocessor system 300 is assigned the task of processing the data packet. Because each processor 350*a*, 350*b* in the multiprocessor system 300 uses the identical hashing function 356*a*, 356*b*, data packets associated with the same network connection are destined to be processed on the same selected processor given that the header information, upon which the hashing function operates, produces an identical hash value. This method of systematically partitioning data streams for connections across processors enables a connection state to live on a single processor for the lifetime of the connection which, in turn, enhances performance of the multiprocessor system.

After determining the selected processor, the scheduling processor 350*a* builds an NDIS packet using the information in the data packet and data packet descriptor. The NDIS packet is then queued up on the selected processor by way of placing the NDIS packet in the selected processor's receive queue. In the example of FIG. 3*a*, each of the processors 350*a*, 350*b* has a receive queue 355*a*, 355*b*. As the DPC runs on the scheduling processor, all the packet descriptors and data packets are read respectively from the memory array 345 and the memory pool 343. As described above, the data is used to build NDIS packets that are queued individually to the selected processor as determined by the hashing function. Upon completion of queuing the NDIS packets, the scheduling processor processes any NDIS packets that were queued for processing to the scheduling processor. This is intended to assist in interrupt moderation. Thereafter, the scheduling processor requests a DPC for each of the other processors in the system that have non-empty receive queues. With reference to FIG. 3*a*, processor 350*a* processes all NDIS packets in the receive queue 355*a*. Processor 350*a* then requests a DPC on processor 350*b* if the receive queue 355*b* is non-empty.

Figure 3B:
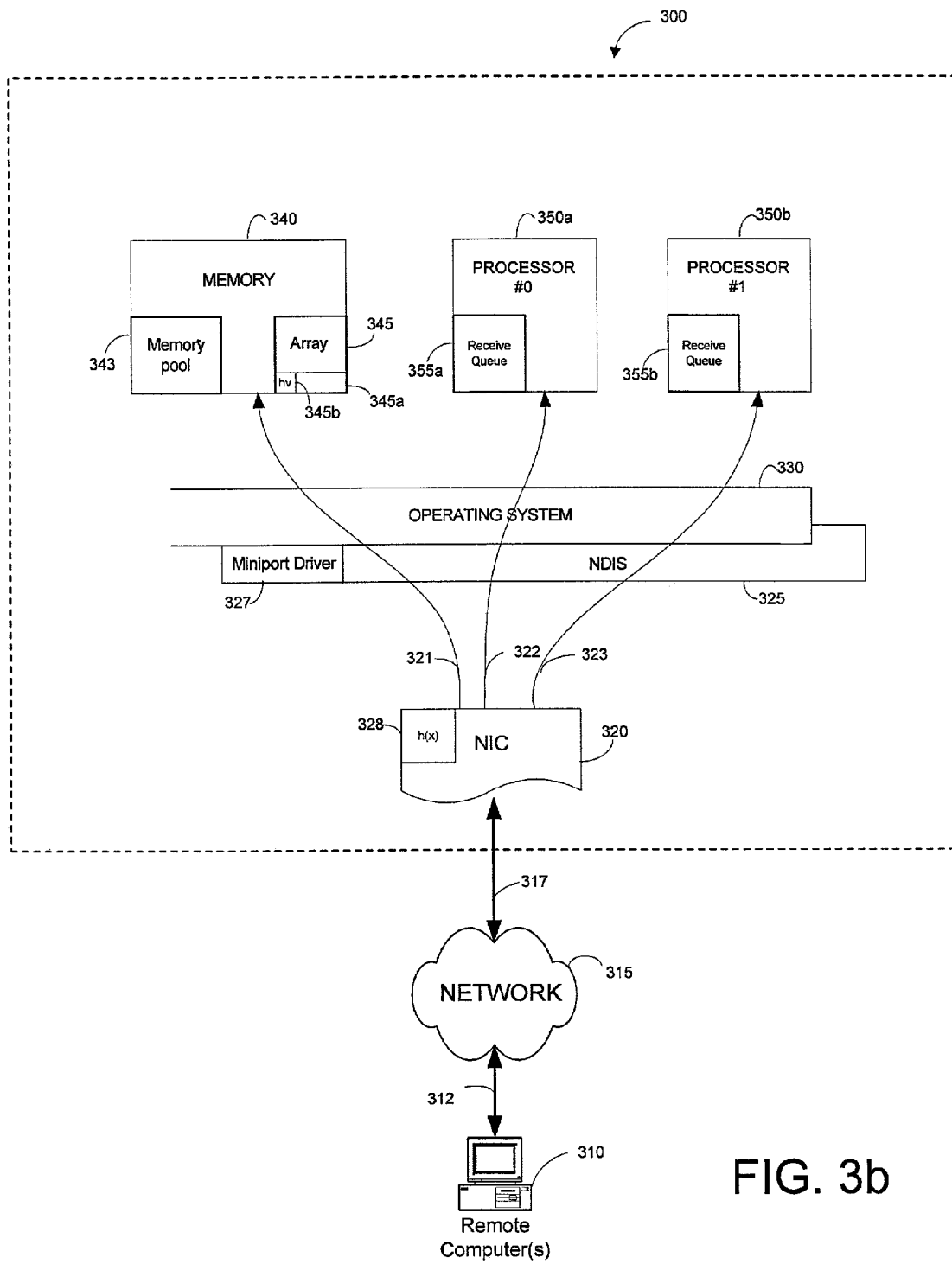

As will be explained further herein below, the process of applying the hashing function to the data packets to determine a hash value is performed at different steps in the method and by different framework components according to the various embodiments of the invention. In an alternative embodiment depicted in FIG. 3*b*, the NIC 320 includes a hashing function 328 that is applied to the protocol headers of the data packet yielding a hash value. The hash value 345*b* is stored in the memory array 345 as part of the packet descriptor 345*a*. This embodiment of the invention enhances performance by enabling the scheduling processor running the DPC to build the NDIS packet by reading only the packet descriptor 345*a* that includes the hash value 345*b* and not the actual data packet.

Figure 3C:
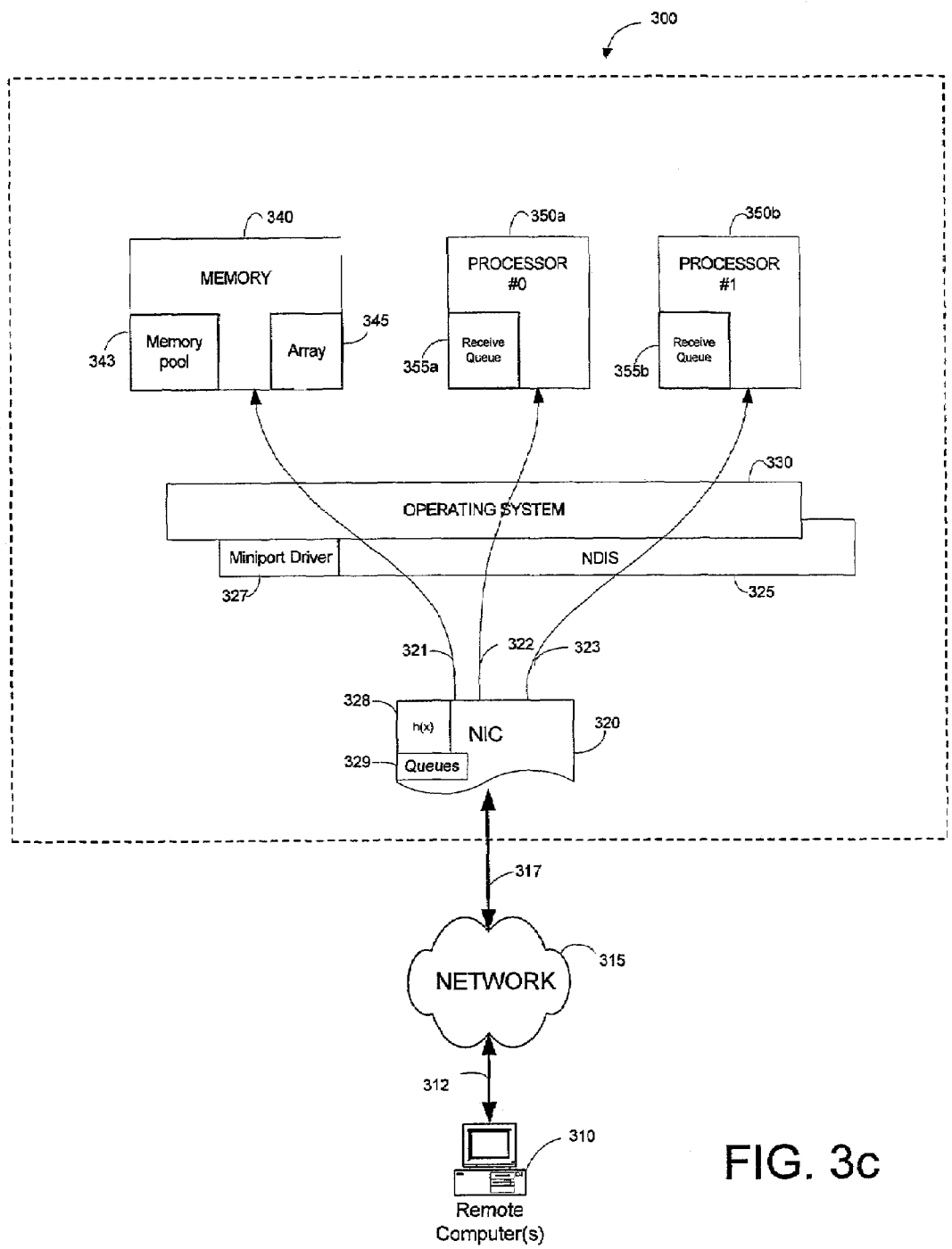

In another embodiment of the present invention depicted in FIG. 3*c*, the NIC 320 maintains descriptor queues 329 for each processor in the multiprocessor system 300. After applying the hashing function 328 to the data packet to determine the hash value, the NIC 320 populates the appropriate descriptor queue 329 with NDIS packets. After hashing of the data packets is complete, the NIC generates an interrupt. As the ISR runs, a DPC request is issued to each selected processor for which the associated descriptor queue is non-empty. This embodiment further enhances performance of the system by providing selected processors with necessary information by way of the receive queue, skipping the steps of writing and reading the packet descriptors to and from memory.

Figure 4:
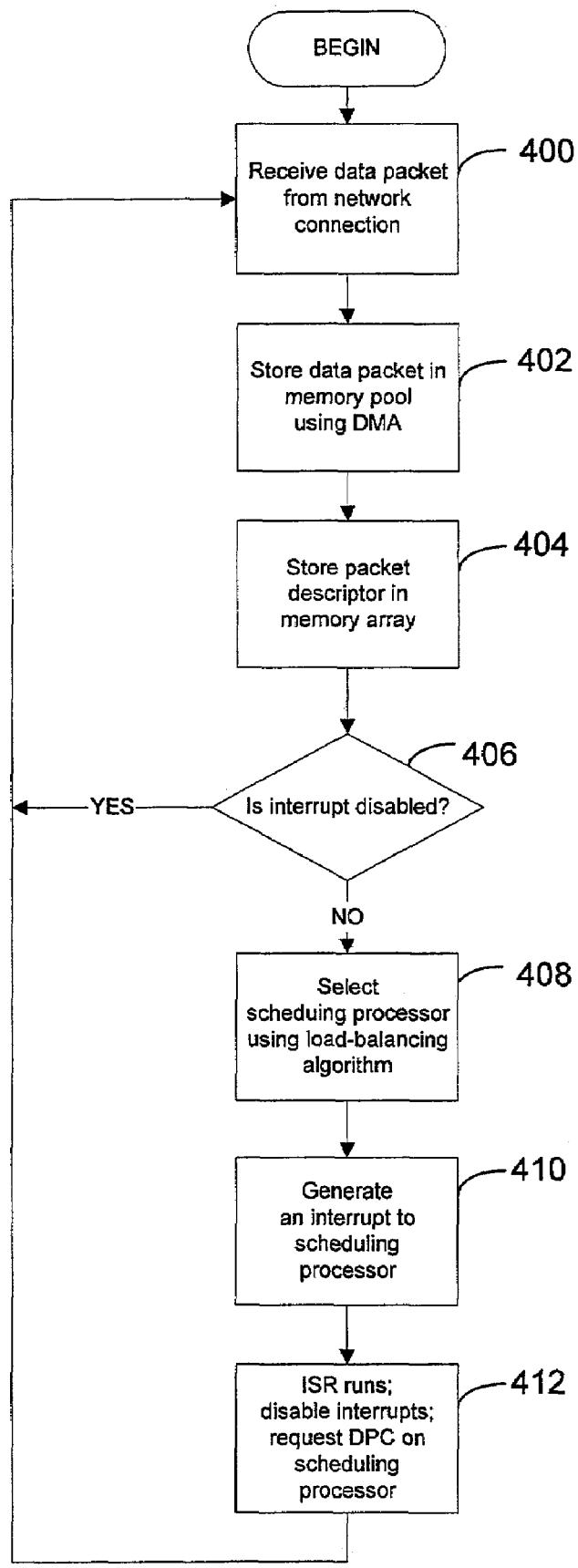
FIG. 4 is a flowchart depicting steps performed by a network interface card scheduling receive-side processing.

Having described the structures that support an exemplary receive-side DPC processing technique embodying the present invention, attention is now directed to FIG. 4 that depicts a set of steps performed by the network interface card to schedule receive-side processing of data packets in the multiprocessor system. The steps described herein below are exemplary. As those skilled in the art will readily appreciate, the present invention can be carried out in a variety of manners and the steps described herein below can be rearranged and modified in accordance with alternative embodiments of the present invention.

The procedure begins at step 400 where the NIC 320 receives a data packet from a remote computer 310. The data packet includes data such as a source port address, a destination port address and other data related specifically to the request. At step 402, the data packet is stored using DMA in the pre-allocated memory pool 343 depicted in FIG. 3*a*. At step 404, a packet descriptor is stored in the memory array 345. Thereafter, at step 406, a determination is made whether to generate an interrupt. If the interrupt is disabled, the method returns to step 400 to receive additional data packets and begin the process of storing them. If the interrupt is not disabled, at step 408 a load-balancing algorithm selects a scheduling processor to handle the original requests. The load-balancing algorithm is any acceptable load-balancing algorithm adopted by the network interface card. In one embodiment of the invention, the scheduling processor selected is the least busy processor in the multiprocessor system 300. In another embodiment of the invention, the scheduling processor rotates between the available processors on a round-robin basis. After the scheduling processor is selected, at step 410 an interrupt is generated by the NIC 320 to the scheduling processor. Thereafter, at step 412 an ISR runs disabling all further interrupts from the NIC 320 and requesting a DPC on the scheduling processor. Thereafter, the procedure returns to step 400 where the NIC 320 continues to receive data packets from the network 315.

Figure 5A:
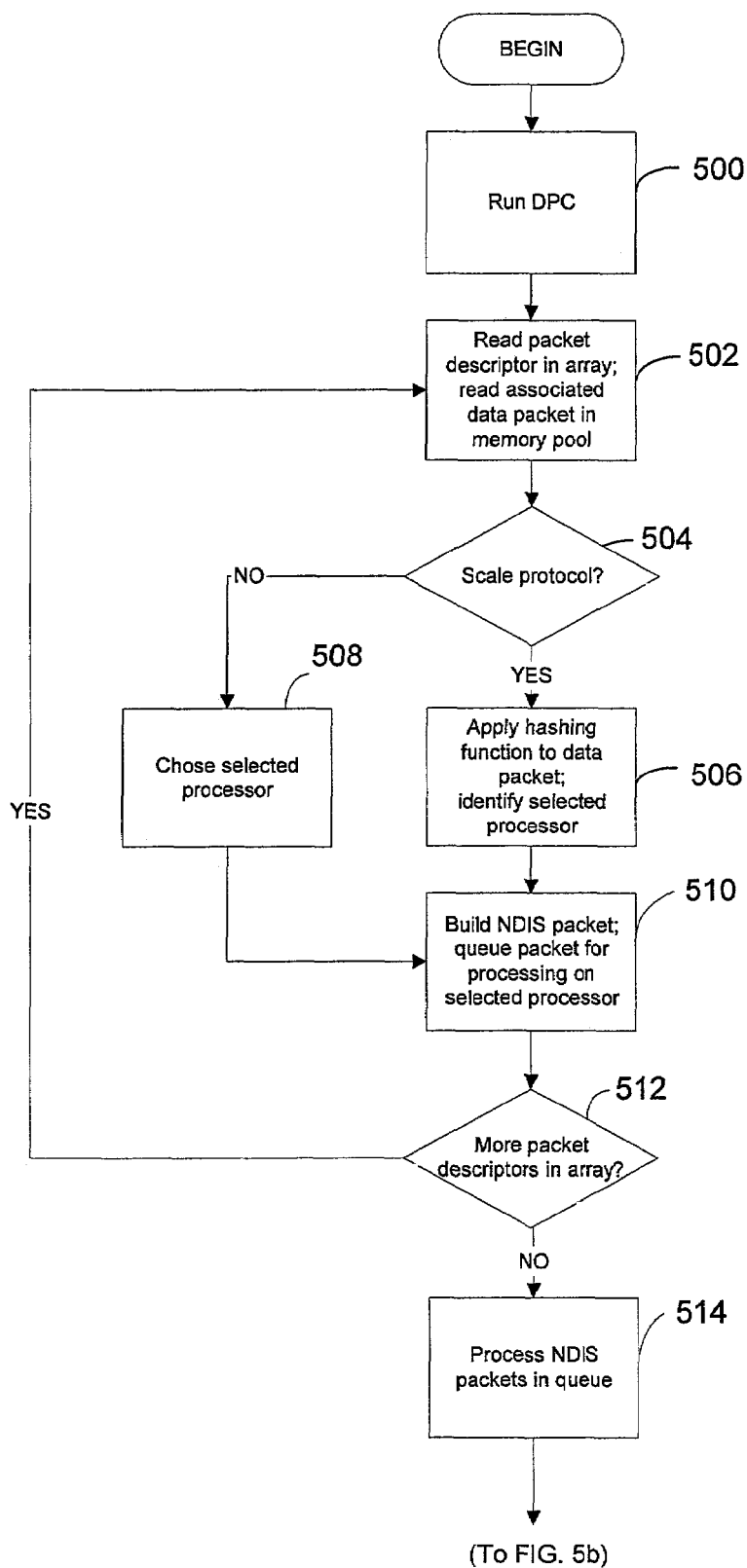
FIGS. 5a–b are flowcharts depicting steps performed by a scheduling processor managing receive-side processing.
Figure 5B:
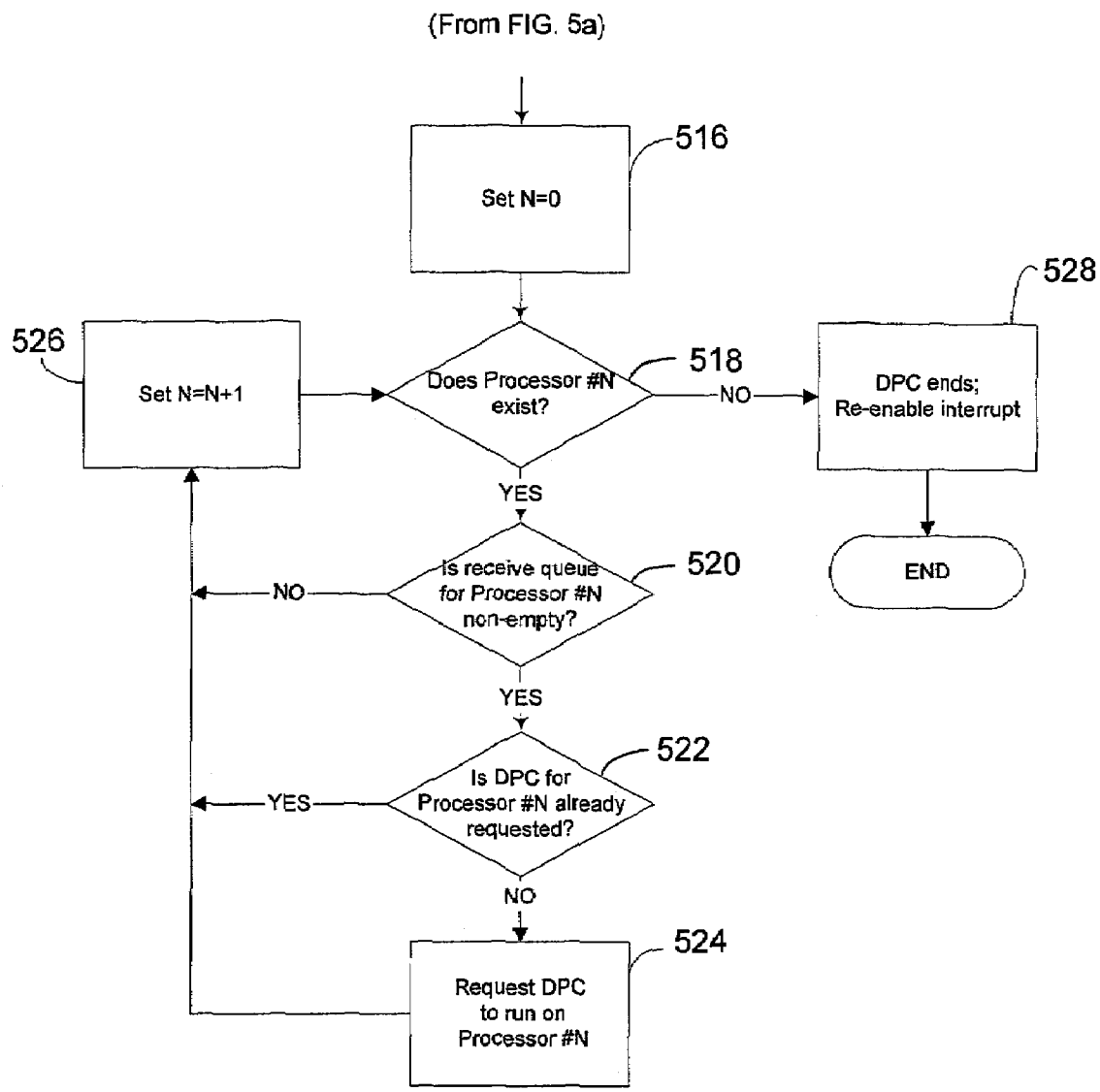

Attention is now directed to FIGS. 5*a*–*b* that depict a set of steps performed by the scheduling processor after the NIC 320 requests a DPC. The steps described herein below are exemplary. The procedure begins at step 500 in FIG. 5*a* wherein the scheduling processor runs the DPC previously requested in step 412. At step 502, the scheduling processor reads both the packet descriptor from the memory array 345 and the data packet from the memory pool 343. In step 504, the procedure determines whether the data packet is of the type that should be scaled across the processors 350*a*, 350*b*. If the data packet should be scaled, in step 506, a hashing function is applied to the protocol headers of the data packet yielding a hash value. With the use of a processor selection policy, the hash value identifies a selected processor in the system. An exemplary processor selection policy includes any acceptable manner of cross-referencing the hash value to a processor in the multiprocessor system, including a processor identification table.

If the data packet is not of the type that should be scaled, in step 508, the selected processor is chosen based on other load-balancing criteria. Next, in step 510, the procedure builds an NDIS packet using information in the data packet descriptor, and the NDIS packet is then queued up on the selected processor previously identified in either step 506 or 508. Queuing up an NDIS packet entails placing the NDIS packet in the receive queue associated with the selected processor. Thereafter, in step 512, the procedure determines whether any additional packet descriptors remain in the memory array 345. If yes, the procedure returns to step 502 where the process of reading the packet descriptor and data packet continues.

If no additional packet descriptors are in the memory array 345, the procedure continues to step 514 where the scheduling processor processes all NDIS packets queued to the scheduling processor in the previous steps. With reference to FIG. 5*b*, the procedure next begins the process of requesting DPCs on all other selected processors in the multiprocessor system 300 that have non-empty receive queues. In step 516, a counter N is set to zero. At step 518, a determination is made whether processor #N exists in the multiprocessor system 330. If no, indicating that all processors have been evaluated by the procedure, the procedure continues to step 528 where the DPC for the scheduling processor concludes and interrupts on the NIC 320 are re-enabled. If processor #N does exist, the procedure continues to step 520 where a determination is made whether the receive queue for processor #N is non-empty. If the receive queue is empty, the procedure continues to step 526 where counter N is incremented by 1, and then on to step 518 again. If the receive queue is non-empty, indicating that NDIS packet(s) have been queued to processor #N, at step 522 a determination is made whether the DPC for processor #N has already been requested to run. If yes, the procedure continues to step 526 where counter N is incremented by 1, and then on to step 518 again. If the DPC for processor #N has not already been requested, the procedure at step 524 requests the DPC to run on processor #N and then continues to step 526 where counter N is incremented. The procedure continues incrementing N until all processors in the multi-processor system 330 are evaluated.

Figure 6:
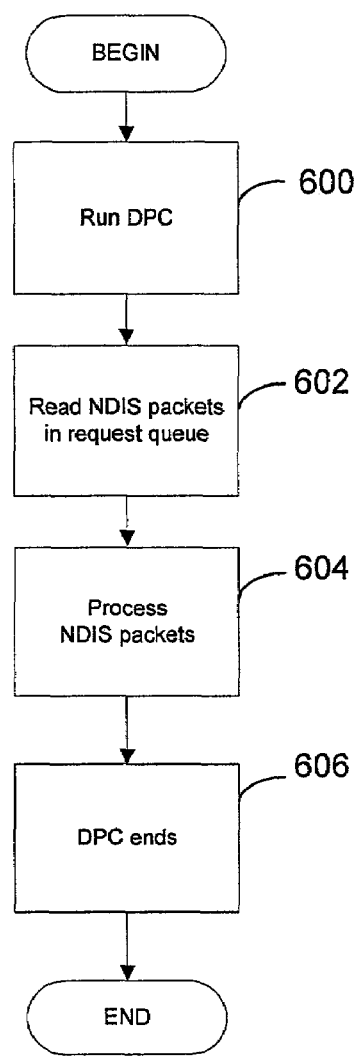
FIG. 6 is a flowchart depicting steps performed by a selected processor in a multiprocessor system performing receive-side processing.

Attention is now directed to FIG. 6 that depicts a set of steps performed by each of the selected processors having the DPC request. The steps described herein below are exemplary. The procedure begins at step 600 in FIG. 6, wherein the procedure runs the DPC at the selected processor. Next, at step 602, the procedure reads the NDIS packets from the receive queue. At step 604, the NDIS packets are processed by the selected processor. After all NDIS packets are processed, at step 606 the DPC ends.

Figure 7:
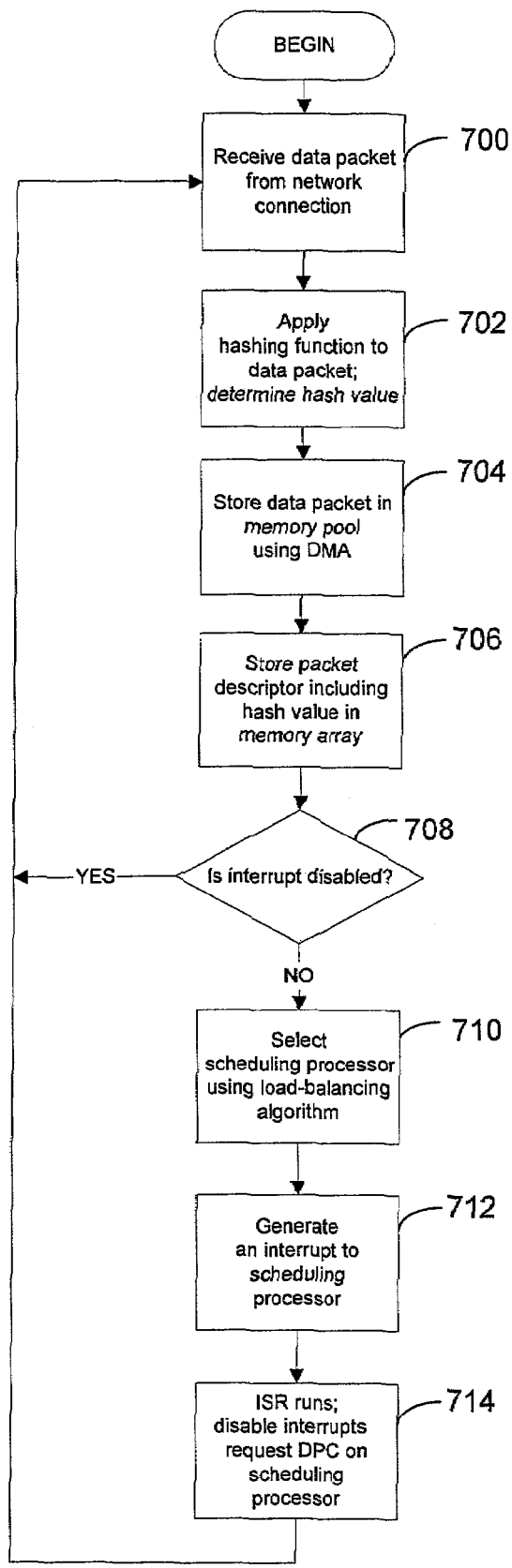
FIG. 7 is a flowchart depicting alternative steps performed by a network interface card scheduling receive-side processing.

Attention is now directed to FIG. 7 that depicts an alternative set of steps performed by the network interface card to schedule receive-side processing of data packets in the multiprocessor system. The steps described herein below are exemplary. The procedure begins at step 700 where the NIC 320 receives a data packet from a remote computer 310. At step 702, a hashing function is applied to the protocol headers of the data packet yielding a hash value that identifies the selected processor. Thereafter, in step 704, the data packet is stored using DMA in the pre-allocated memory pool 343 depicted in FIG. 3*b*. At step 706, a packet descriptor including the hash value is stored in the memory array 345. Thereafter, at step 708, a determination is made whether to generate an interrupt. If the interrupt is disabled, the method returns to step 700 to receive additional data packets and begin the process of storing them. If the interrupt is not disabled, at step 710 a load-balancing algorithm selects a scheduling processor that will schedule processing of the data packets. The load-balancing algorithm is any acceptable load-balancing algorithm adopted by the network interface card. In one embodiment of the invention, the scheduling processor selected is the least busy processor in the multiprocessor system 300. In another embodiment of the invention, the scheduling processor is selected in a round-robin method from amongst the available processors. After the scheduling processor is selected, at step 712 an interrupt is generated by the NIC 320 to the scheduling processor. Thereafter, at step 714, the ISR runs disabling all further interrupts from the NIC 320 and requesting a DPC on the scheduling processor. Thereafter, the procedure returns to step 700 where the NIC 320 continues to receive data packets from the network 315.

Figure 8A:
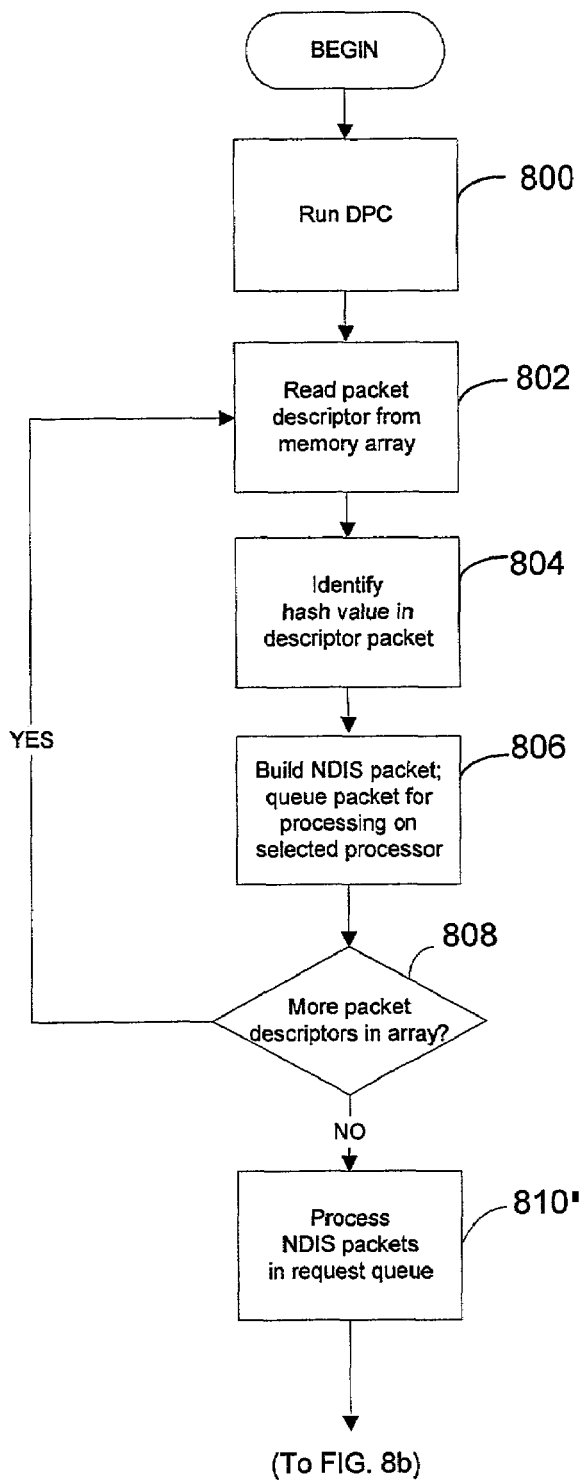
FIGS. 8a–b are flowcharts depicting alternative steps performed by a scheduling processor managing receive-side processing.
Figure 8B:
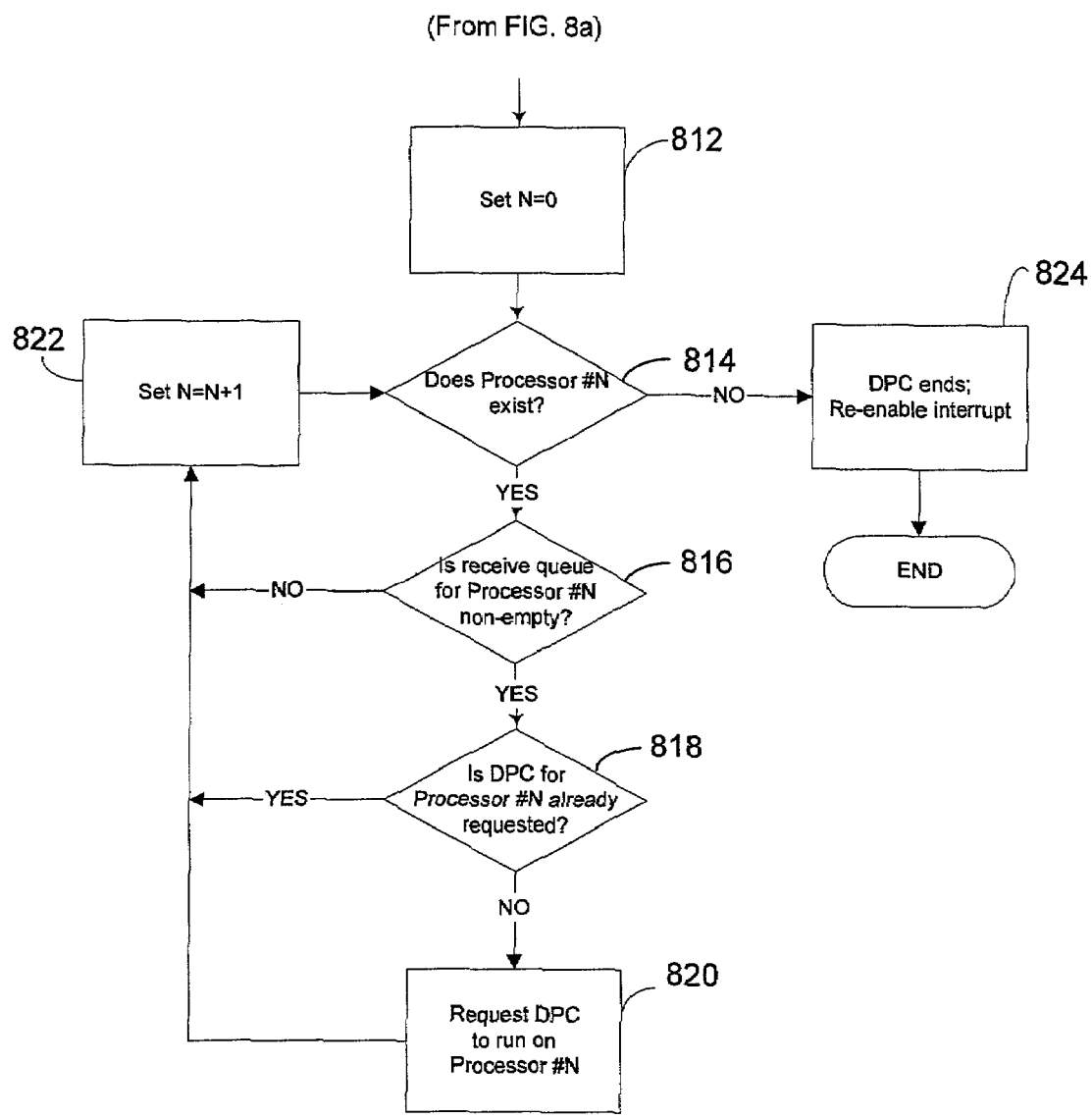

Attention is now directed to FIGS. 8*a*–*b* that depict a set of steps performed by the scheduling processor after the NIC 320 requests a DPC in step 714. The steps described herein below are exemplary. The procedure begins at step 800 in FIG. 8*a* wherein the scheduling processor runs the DPC previously requested in step 714. At step 802, the scheduling processor reads the packet descriptor from the memory array 345. At step 804, the procedure identifies the hash value stored previously as part of the retrieved packet descriptor. Because the hash value is readily available, there is no need for the procedure to retrieve the actual data packet from the memory pool 343, thus, decreasing processor cycles and improving processor cache locality resulting in overall increased performance of the system. In step 806, the procedure builds the NDIS packet using the information from the data packet descriptor, and the NDIS packet is then queued up on the selected processor identified by the hash value and the processor selection policy. Queuing up an NDIS packet entails placing the NDIS packet in the receive queue belonging to the selected processor. Thereafter, in step 808, the procedure determines whether any additional packet descriptors remain in the memory array 345. If yes, the procedure returns to step 802 where the process of reading the packet descriptors continues.

If no additional packet descriptors are in the memory array 345, the procedure continues to step 810 where the scheduling processor processes all NDIS packets queued to the scheduling processor in the previous steps. With reference to FIG. 8*b*, the procedure next begins the process of requesting DPCs on all other selected processors in the multiprocessor system 300 that have non-empty receive queues. In step 812, a counter N is set to zero. At step 814, a determination is made whether processor #N exists in the multiprocessor system 330. If processor #N does not exist, indicating that all processors have been evaluated, the procedure continues to step 824 where the DPC for the scheduling processor concludes and interrupts on the NIC 320 are re-enabled. If processor #N does exist, the procedure continues to step 816 where a determination is made whether the receive queue for processor #N is non-empty. If the receive queue is empty, the procedure continues to step 822 where counter N is incremented by 1, and then on to step 814 again. If the receive queue is non-empty, indicating that NDIS packet(s) have been queued to processor #N, at step 818 a determination is made whether the DPC for processor #N has already been requested. If yes, the procedure continues to step 822 where counter N is incremented by 1, and then on to step 814 again. If the DPC for processor #N has not already be requested, the procedure at step 820 requests the DPC to run on processor #N and then continues to step 822 where counter N is incremented. The procedure continues incrementing N until all processors in the multiprocessor system 330 are evaluated.

The selected processors in the alternative embodiment of the present invention depicted in FIGS. 7, 8a and 8b follow the same steps outlined in and described above in conjunction with FIG. 6. The steps described therein are exemplary. The procedure begins at step 600 in FIG. 6, wherein the procedure runs the DPC at the selected processor. Next, at step 602, the procedure reads the NDIS packets from the receive queue. At step 604, the NDIS packets are processed by the selected processor. After all NDIS packets are processed, at step 606 the DPC ends.

Figure 9:
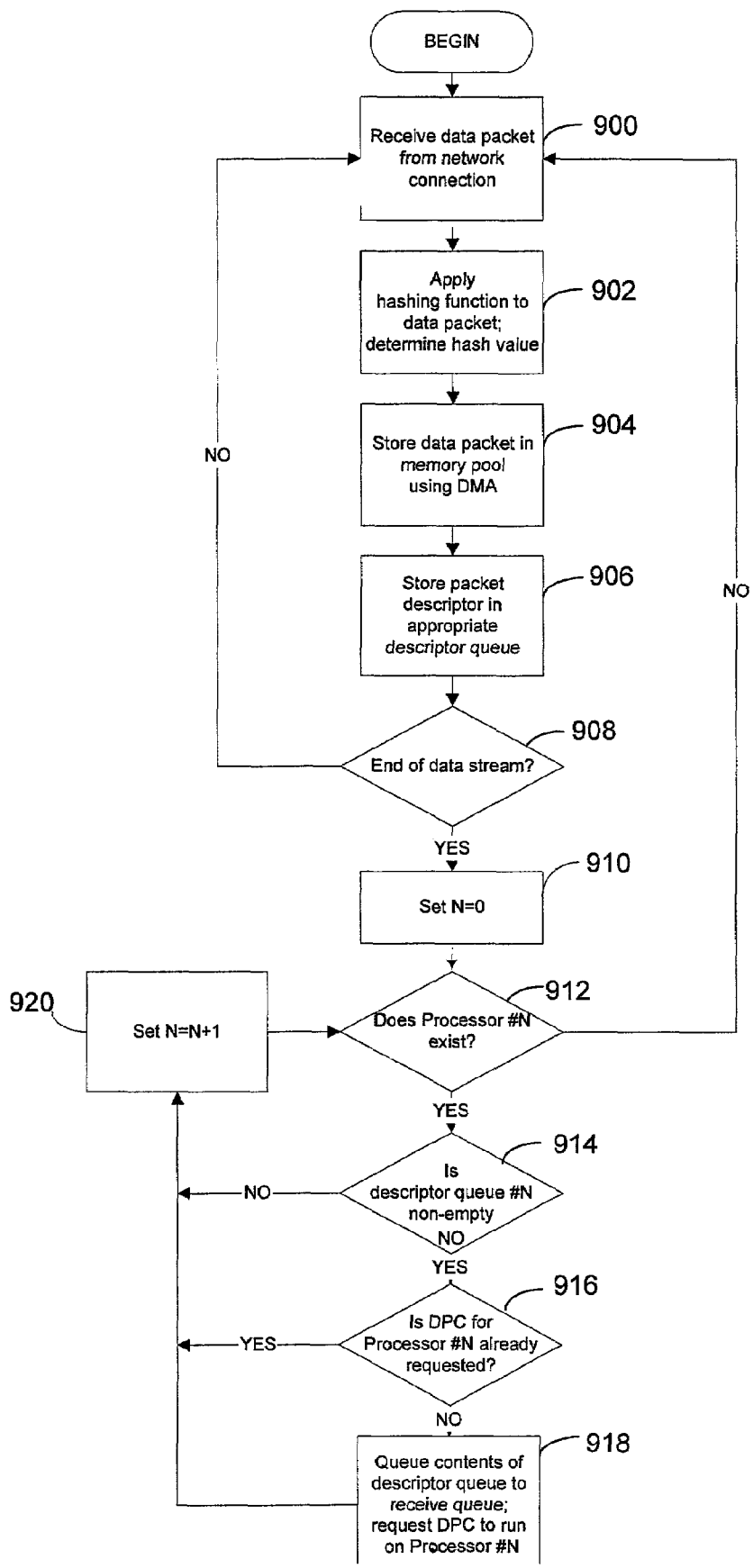
FIG. 9 is a flowchart depicting alternative steps performed by a network interface card scheduling receive-side processing.

Attention is now directed to FIG. 9 that depicts another alternative set of steps performed by the network interface card to schedule receive-side processing of data packets in the multiprocessor system. The steps described herein below are exemplary. The procedure begins at step 900 where the NIC 320 receives a data packet from a remote computer 310. At step 902, a hashing function is applied to the protocol headers of the data packet yielding a hash value that, in conjunction with the processor selection policy, identifies the selected processor. Thereafter, in step 904, the data packet is stored using DMA in the pre-allocated memory pool 343 depicted in FIG. 3c. At step 906, a packet descriptor including the hash value is stored in a descriptor queue 329 located at the NIC 320. The NIC 320 maintains a descriptor queue for each of the processors in the multiprocessor system 300. Each descriptor queue holds all packet descriptors scheduled to be processed by the selected processor.

Thereafter, at step 908, a determination is made whether the end of the data stream has occurred. If the data stream has not ended, the procedure returns to step 900 to receive additional data packets and begin the process of hashing and storing the data packets. If the data stream has ended, at step 910 a counter N is set to zero. At step 912, a determination is made whether processor #N exists in the multiprocessor system 330. If no, indicating that all processors have been evaluated by the procedure, the procedure returns to step 900 where additional data packets are received by the NIC 320. If processor #N does exist, the procedure continues to step 914 where a determination is made whether the descriptor queue for processor #N is non-empty. If the descriptor queue is empty, the procedure continues to step 920 where counter N is incremented by 1, and then on to step 912 again. If the descriptor queue is non-empty, indicating that packet descriptors have been scheduled for processor #N, at step 916 a determination is made whether the DPC for processor #N has already been requested to run. If yes, the procedure continues to step 920 where counter N is incremented by 1, and then on to step 518 again. If the DPC for processor #N has not already be requested, the procedure at step 918 queues the contents of the descriptor queue to the receive queue and requests a DPC to run on processor #N. Next, the procedure continues to step 920 where counter N is incremented. The procedure continues incrementing N until all descriptor queues maintained by the NIC 320 are evaluated.

Figure 10:
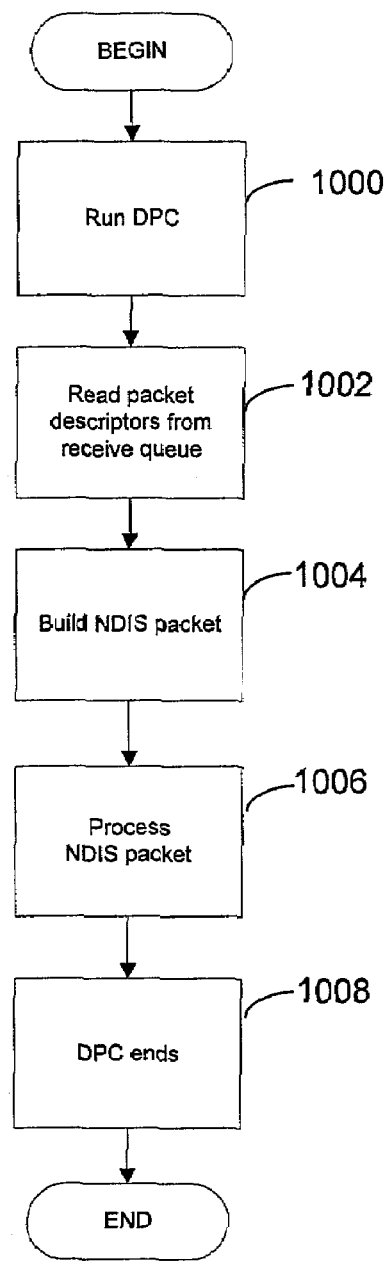
FIG. 10 is a flowchart depicting alternative steps performed by a selected processor in a multiprocessor system performing receive-side processing.

Attention is now directed to FIG. 10 that depicts a set of steps performed by each of the selected processors requested to run the DPC in step 918 depicted in FIG. 9. The steps described herein below are exemplary. The procedure begins at step 1000 in FIG. 10, wherein the procedure runs the DPC at the selected processor. Next, at step 1002, the procedure reads the packet descriptors from the receive queue. At step 1004, the procedure builds the NDIS packets using the packet descriptors queued by the NIC 320. At step 1006, the NDIS packets are processed by the selected processor. After all NDIS packets are processed by the selected processor, at step 1008 the DPC ends.

Illustrative embodiments of the present invention and certain variations thereof have been provided in the Figures and accompanying written description. The present invention is not intended to be limited to the disclosed embodiments. Rather the present invention is intended to cover the disclosed embodiments as well as others failing within the scope and spirit of the invention to the fullest extent permitted in view of this disclosure and the inventions defined by the claims appended herein below.

What is claimed is:

1. A method for scheduling receive-side processing of data packets in a multiprocessor computer system comprising a network interface card communicably coupled to a network to receive data streams, memory and at least two local processors, the method comprising the steps of:
   receiving a data packet from a remote requesting client;
   storing the data packet in memory;
   first applying, by a scheduling processor of the at least two local processors, a mapping algorithm to the data packet, the mapping algorithm yielding a map value;
   second applying the map value to a processor selection policy to identify the local processor as a selected processor to perform receive-side processing of the data packet;
   directing the received data packet to the selected processor; and
   processing the data packet,
   wherein the scheduling processor and the network interface card are separate and distinct components of the computer system.

2. The method of claim 1 wherein the receiving step comprises receiving, by the network interface card, the data packet from the network, and wherein the method further comprises:
   storing the data packet and a data packet descriptor in memory.

3. The method of claim 2 wherein the receiving step further comprises selecting, by the network interface card, the scheduling processor and sending a message to the scheduling processor requesting handling of the data packet.

4. The method of claim 3 wherein the selecting step comprises utilizing, by the network interface card, a load-balancing algorithm to select the scheduling processor.

5. The method of claim 4 wherein the load-balancing algorithm determines the least active processor in the multiprocessor system.

6. The method of claim 3 wherein the first applying step comprises reading, by the scheduling processor, the data packet descriptor and the data packet from memory and applying the mapping algorithm to the data packet yielding the map value.

7. The method of claim 6 wherein the second applying step comprises utilizing, by the scheduling processor, a map table to resolve the selected processor.

8. The method of claim 6 wherein the directing step comprises: queuing, by the scheduling processor, the data packet to run on the selected processor; and
   sending, by the scheduling processor, a message to the selected processor requesting processing of the data packet.

9. The method of claim 8 wherein the queuing step comprises building a Network Driver Interface Specification data packet and placing the Network Driver Interface Specification data packet in a receive queue belonging to the selected processor.

10. The method of claim 8 wherein the processing step comprises: processing, by the selected processor, the data packet queued to the selected processor.

11. The method of claim 1 wherein the first applying step comprises:
storing, by the network interface card, the data packet in memory.

12. The method of claim 11 wherein the second applying step comprises:
utilizing, by the scheduling processor, a map table to resolve the selected processor; and
storing a data packet descriptor including the map value in memory.

13. The method of claim 12 wherein the directing step comprises:
selecting, by the network interface card, a scheduling processor; and
sending, by the network interface card, a message to the scheduling processor requesting handling of the data packet.

14. The method of claim 13 wherein the selecting step comprises utilizing, by the network interface card, a load-balancing algorithm to select the scheduling processor.

15. The method of claim 13 wherein the directing step comprises:
reading, by the scheduling processor, the data packet descriptor from memory;
queuing, by the scheduling processor, the data packet to run on the selected processor; and
sending, by the scheduling processor, a message to the selected processor requesting processing of the data packet.

16. The method of claim 15 wherein the reading step comprises reading the map value from the data packet descriptor.

17. The method of claim 15 wherein the queuing step comprises building a Network Driver Interface Specification data packet and placing the Network Driver Interface Specification data packet in a receive queue belonging to the selected processor.

18. The method of claim 15 wherein the processing step comprises processing, by the selected processor, the data packet queued to the selected processor.

19. The method of claim 1 further comprising:
establishing a network connection between a remote requesting client and the multiprocessor computer system,
wherein the establishing step comprises identifying a type of network connection initiated by the remote requesting client.

20. The method of claim 19 wherein the network connection is a TCP connection.

21. The method of claim 1 wherein the mapping algorithm is a hashing function.

22. The method of claim 21 wherein the map value is a hash value.

23. A computer-readable medium having computer-executable instructions for facilitating scheduling receive-side processing of data packets in a multiprocessor system computer comprising a network interface card communicably coupled to a network to receive data streams, memory and at least two local processors, the computer-readable medium having computer-executable instructions facilitating performing the steps of:
receiving a data packet from the network;
first applying a mapping algorithm to the data packet, the mapping algorithm yielding a map value;
second applying, by a scheduling processor of the at least two local processors, the map value to a processor selection policy to identify the local processor as a selected processor to perform receive-side processing of the data packet;
directing the received data packet to the selected processor; and
processing the data packet,
wherein the scheduling processor and the network interface card are separate and distinct components of the computer system.

24. A method for scheduling receive-side processing of data packets in a multiprocessor system computer comprising a network interface card communicably coupled to a network to receive data streams, memory and at least two local processors, the method comprising the steps of:
issuing, by the network interface card, a select local processor request call having a plurality of call parameters comprising a data packet header and a local processor selection policy; and
receiving, by the network interface card, a select local processor request response having a plurality of response parameters comprising a local processor ID,
wherein the one of the at least two local processors and the network interface card are separate and distinct components of the computer system.

25. The method of claim 24 wherein the step of issuing the select local processor request call the call parameters further comprise a hashing function.

26. The method of scheduling receive-side processing of data packets in a multiprocessor computer system comprising a network interface card communicably coupled to a network to receive data streams, memory and at least two local processors, the method comprising the steps of:
receiving a data packet from the network;
selecting, by one of the at least two local processors, one of the at least two local processors to perform receive-side processing of the data packet; and
directing the received data packet to the selected processors,
wherein the one of the at least two local processors and the network interface card are separate and distinct components of the computer system.

27. The method of claim 26, wherein the selecting includes supplying a mapping algorithm to the data packet to yield a map value.

28. The method of claim 27, wherein the selecting includes applying the map value to a processor selection policy to identify the local processor as the selected processor to perform receive-side processing of the data packet.

* * * * *